March 24, 1931. H. WARING 1,797,812
APPARATUS FOR SEPARATING SUSPENDED MATTER FROM FLUIDS
Filed Nov. 2, 1928
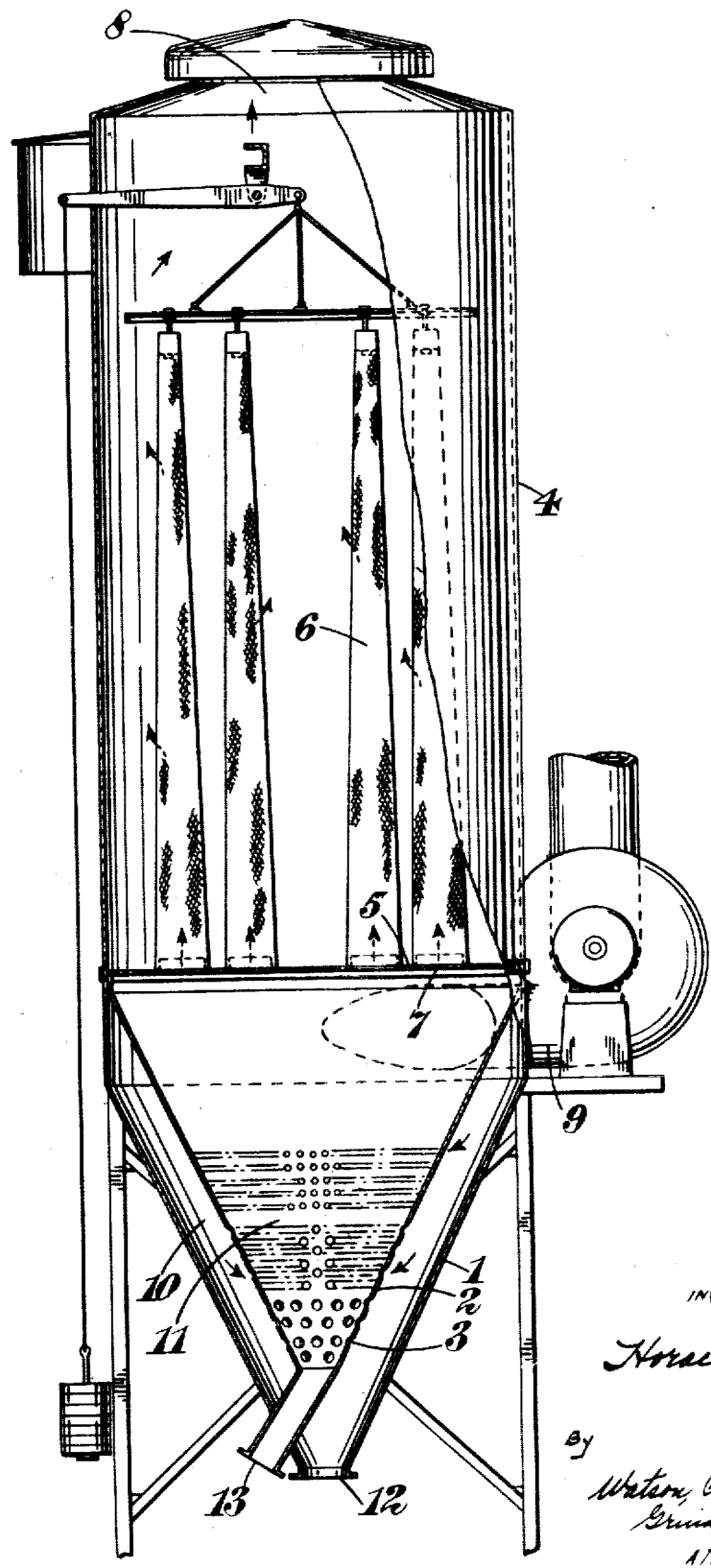
INVENTOR
Horace Waring
By
Watson, Coit, Morse & Grindle
Attys Patented Mar. 24, 1931

1,797,812

UNITED STATES PATENT OFFICE

HORACE WARING, OF LIVERPOOL, ENGLAND, ASSIGNOR TO ASSOCIATED LEAD MANUFACTURERS LIMITED, OF LONDON, ENGLAND, A BRITISH COMPANY

APPARATUS FOR SEPARATING SUSPENDED MATTER FROM FLUIDS

Application filed November 2, 1928, Serial No. 316,728, and in Great Britain September 4, 1928.

This invention comprises improvements in or relating to apparatus for separating or classifying suspended matter from fluids.

It is an object of the invention to provide a method and means for separating suspended matter from fluids which shall be simple, efficient and capable of classifying the matter removed from suspension into more than one product. It is to be understood that the term fluids used herein includes both gases and liquids.

According to the invention a method of removing matter from suspension in a fluid consists in directing a number of streams of the fluid across a space wherein they are separated from one another by an intervening body of fluid which does not move with the streams, or moves relatively slowly, so that the suspended matter passes readily from the moving streams into the intervening body of fluid.

Preferably the fluid streams are directed in a horizontal or inclined direction and are in several banks one above another, so that suspended matter from the upper banks tends to fall through the intervening fluid into lower banks and increase the density of suspended matter therein. The increased density of suspended matter in the stream or streams of fluid in the lower banks facilitates its removal.

A convenient form of apparatus for carrying the said method into effect comprises a perforated plate and means to direct a fluid containing suspended matter through the said perforations. The fluid is thereby broken up into separated streams with an intervening relatively still body of fluid.

The perforated plate will cause coarser suspended matter to be thrown down on one side of the plate, while finer suspended matter is precipitated on the other.

In one convenient and very effective form the apparatus comprises an outer separating chamber, circular in plan, an inner concentric perforated partition therein, means for supplying the fluid to be treated to the outer chamber in a tangential direction and means for withdrawing treated fluid from within the partition. The outer chamber and the space inside the partition may be supplied with separate discharge means at the bottom for precipitated suspended matter and thus two-graded products may be obtained.

Preferably the separating chamber is conical, widest at the top and has its tangential inlet there; it thus resembles generally a conical cyclone separator but the perforations take the place of the usual lower central opening in the inner cone.

One embodiment of the invention will now be described with reference to the accompanying drawings of which—

Figure 1 is a vertical central section through a separator of the preferred conical form.

The separator comprises an outer conical casing 1, which is imperforate, and an inner conical partition 2, which is perforated, as shown, with horizontal rows of holes 3.

Superimposed upon this conical structure is an upright cylindrical casing 4. The interior of this casing is separated from the interior of the conical structure by a diaphragm 5. The interior of the conical structure communicates, however, with the interior of the casing 4 by way of a series of elongated conical filter bags 6, the open ends of which are at the bottom and open directly, through holes 7 in the diaphragm 5, into the interior of the conical structure at the top thereof. The casing 4 has an outlet 8 at the top.

The gas or vapour carrying the particles to be separated is fanned into the conical structure by way of an inlet 9 leading tangentially into the annular space 10 between the casing 1 and the partition 2, at the top thereof. The gas leaves the apparatus by way of the outlet 8. The gas has, therefore, to pass through the perforated partition 2, thence into the filter bags 6 and through the walls thereof into the interior of the casing 4, and finally out through the outlet 8.

During this passage of the gas through the apparatus the coarser particles drop out in the annular space 10, which thus constitutes a separating chamber, and the finer particles drop out in the central conical space 11. The residual dust is caught by the walls of the filter bags 6 and drops down into the central space 11.

The separated particles are discharged from the spaces 10 and 11 by way of separate outlets 12 and 13 respectively. The apparatus, therefore, not only separates, but classifies the suspended matter into coarse and fine or heavy and light particles.

As stated above, residual dust is caught by the walls of the filter bags 6. The weight of the bags 6 is increased by the dust accumulating on them and as the weight of the bags is balanced by the counterweight 14, if the counter-weight is properly chosen, a periodic collapse of the bags occurs which facilitates the discharge of dust therefrom into said central space 11.

The gas carrying the fine particles in suspension is directed in a series of horizontal streams into the space 11 and the suspended matter settles into the body of gas occupying said space. It is found that this is a very effective way of separating suspended matter from a gas containing it. The streams of gas, moreover, are disposed in banks and the particles settling out of the upper banks fall into the lower banks and increase the density of suspended matter therein. The effect is that separation is facilitated.

The apparatus may comprise a plurality of inner concentric perforated partitions and the perforations in each partition may be in staggered relationship with the perforations of adjacent partitions.

The perforations may be circular holes or they may be narrow slots. For example, there may be rows of slots set with their ends pointing up and down separated by rows of horizontal slots.

By reference to the drawing it will be noted that the perforations are provided in the lower part only of the cone. The purpose of this arrangement is to obtain an intense centrifugal separation in the upper part of the separator in addition to the separation which results from the passage of the gases through the perforated part of the cone. It will be appreciated that this effect is due to the entry of the gases in the annular space at high velocity and the absence of perforations in the upper part of the partition, so that the gases retain their linear velocity without appreciable loss as they pass through a spiral path downwardly in the annular space provided between the outer chamber and the partition. It will be apparent that if the partition were perforated at the top as well as at the bottom the loss in velocity would be sufficient to prevent any appreciable separation of the heavier particles from the gas while the latter is moving in the annular space.

In the intense centrifugal action which takes place in the upper part of the annular space there results an effective and rapid separation of the heavier suspended particles. The gases, freed from the heavier solids, then pass through the perforated part of the cone and are projected in fine superposed streams across the comparatively quiescent space within the inner cone. The comparative quiescence of this space permits the remaining suspended particles in the gases to drop out of the fine streams of gases and gravitate to the bottom of the cone. In doing so they have to fall through the lower streams of dust-carrying gases, and as they pass through these streams they serve to promote the separation of solids therefrom by a kind of gathering action.

It will further be noted that the size of the perforations is graduated as illustrated in the drawing, the larger perforations being arranged near the lower end of the partition. The purpose of this distribution of the perforations is to ensure that the linear velocity of the gases moved in a spiral downward path in the annular space between the outer chamber and the partition shall not be reduced too suddenly, and secondly, that the quiescence of the space within the inner cone should not be unduly disturbed by the impinging into it of the fine streams of dust-carrying gases from the annular separating space between the two cones. In this connection it will be appreciated that the pressure of the gases will decrease towards the bottom of the said annular space and consequently the size of the perforations in the cone can safely be graduated to a progressively larger size towards the bottom.

It will also be appreciated that this consideration, as to preserving as far as possible relative quiescence within the inner cone, is bound up with the further effect, that, in correspondence with the lessening of the pressure as the gases travel towards the bottom of the annular space between the two cones, the resistance to their passage through the perforated part of the inner cone is reduced by the progressive increase in the size of the perforations.

The apparatus is advantageously combined with the apparatus described in my prior U. S. Patent No. 1,761,377, filed March 9, 1927.

I claim:—

1. In a separator for separating solid suspended matter from gases, the combination of a downwardly directed conical separating chamber having a tangential gas inlet at the top and a discharge outlet at the bottom for separated matter, a gas outlet at the top of said chamber, a downwardly directed perforated cone situated within the separating chamber so as to be interposed in the part of the gas between the tangential inlet aforesaid and the said gas outlet, said cone having a discharge outlet at the bottom and the perforations in the cone being situated in the lower part only thereof so as to obtain an intense centrifugal separating action in the upper part of the separator in addition to the separation which results from the passage of the gases through the perforated cone.

2. In a separator for separating solid suspended matter from gases, the combination of a downwardly directed conical separating chamber having a tangential gas inlet at the top and a discharge outlet at the bottom for separated matter, a gas outlet at the top of said chamber, a downwardly directed perforated cone situated within the separating chamber so as to be interposed in the part of the gas between the tangential inlet aforesaid and the said gas outlet, said cone having a discharge outlet at the bottom and the perforations in the cone being situated substantially in the lower half only thereof so as to obtain an intense centrifugal separating action in the upper part of the separator in addition to the separation which results from the passage of the gases through the perforated cone.

3. In a separator for separating solid suspended matter from gases, the combination specified in claim 1 wherein the perforations of the cone are graduated in size towards the bottom of the cone, the largest holes being lowermost for the purpose herein set forth.

In testimony whereof I affix my signature.

HORACE WARING.